United States Patent
Oh et al.

(10) Patent No.: US 11,225,243 B1
(45) Date of Patent: Jan. 18, 2022

(54) METHOD OF CONTROLLING SPLIT INFLOW OF CONDENSATE WATER IN HYBRID ENGINE

(71) Applicants: HYUNDAI MOTOR COMPANY, Seoul (KR); KIA MOTORS CORPORATION, Seoul (KR)

(72) Inventors: Young-Kyu Oh, Gwacheon-si (KR); Keum-Jin Park, Anyang-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 17/090,016

(22) Filed: Nov. 5, 2020

(30) Foreign Application Priority Data

Sep. 23, 2020 (KR) .................... 10-2020-0123022

(51) Int. Cl.
*B60W 20/19* (2016.01)
*B60W 10/06* (2006.01)
*F02M 26/46* (2016.01)

(52) U.S. Cl.
CPC ............ *B60W 20/19* (2016.01); *B60W 10/06* (2013.01); *F02M 26/46* (2016.02); *B60W 2510/0604* (2013.01); *B60W 2540/10* (2013.01)

(58) Field of Classification Search
CPC ............... B60W 20/19; B60W 10/06; B60W 2510/0604; B60W 2540/10; F02M 26/46
USPC ........................................................ 123/395
See application file for complete search history.

(56) References Cited

U.S. PATENT DOCUMENTS

| 10,876,501 | B2 | 12/2020 | Kobayashi | |
|---|---|---|---|---|
| 2014/0100074 | A1* | 4/2014 | Glugla | B60W 30/18 477/3 |
| 2018/0135569 | A1 | 5/2018 | Han et al. | |
| 2019/0249628 | A1 | 8/2019 | Kobayashi | |
| 2020/0355143 | A1* | 11/2020 | Kuske | F02M 26/30 |

FOREIGN PATENT DOCUMENTS

| JP | 2020062931 A | 4/2020 |
|---|---|---|
| JP | 2020101108 A | 7/2020 |
| KR | 10-2018-0053102 A | 5/2018 |
| KR | 20190098054 A | 8/2019 |

* cited by examiner

*Primary Examiner* — Mahmoud Gimie
(74) *Attorney, Agent, or Firm* — Lempia Summerfield Katz LLC (57) ABSTRACT

A method of controlling a split inflow of condensate water in a hybrid engine includes: determining whether condensate water is generated from an exhaust gas recirculation (EGR) device of a hybrid electric vehicle (HEV); determining an amount of the condensate water introduced into an hybrid engine; determining whether a vehicle speed of the HEV is within a predetermined speed range; determining whether a request torque of the HEV is within a predetermined torque range; determining whether a duration time of the vehicle speed within the predetermined speed range, and a duration time of the request torque within the predetermined torque range are greater than or equal to a predetermined duration time, respectively; and when the determined duration times are greater than or equal to the predetermined duration time, increasing an engine torque of the HEV.

9 Claims, 10 Drawing Sheets

METHOD OF CONTROLLING SPLIT INFLOW OF CONDENSATE WATER IN HYBRID ENGINE

CROSS-REFERENCE TO RELATED APPLICATION

This application claims priority to and the benefit of Korean Patent Application No. 10-2020-0123022, filed on Sep. 23, 2020, the entire contents of which are incorporated herein by reference.

FIELD

The present disclosure relate to a method of splitting condensate water which is generated by an exhaust gas recirculation (EGR) device in a hybrid vehicle and introducing the split condensate water into an engine.

BACKGROUND

The statements in this section merely provide background information related to the present disclosure and may not constitute prior art.

An exhaust gas recirculation (EGR) device is a device which recirculates a portion of an exhaust gas combusted in an engine to the engine again, thereby reducing a temperature of a combustion chamber to induce suppression of nitrogen oxide ($NO_x$).

The EGR device includes an EGR valve which is controlled according to an input signal from an electronic control unit (ECU), an EGR passage between an intake pipe and an exhaust pipe, and an EGR cooler for reducing a temperature of an exhaust gas recirculated to the combustion chamber, and the EGR device is operated according to an output of the engine.

Thus, the recirculated gas by the EGR device is mixed with outside air and then introduced into the engine. A temperature of the outside air, which is rapidly compressed by a turbocharger, is increased and thus the outside air expands, and an oxygen density is decreased such that charging efficiency in a cylinder is degraded.

Figure 1:
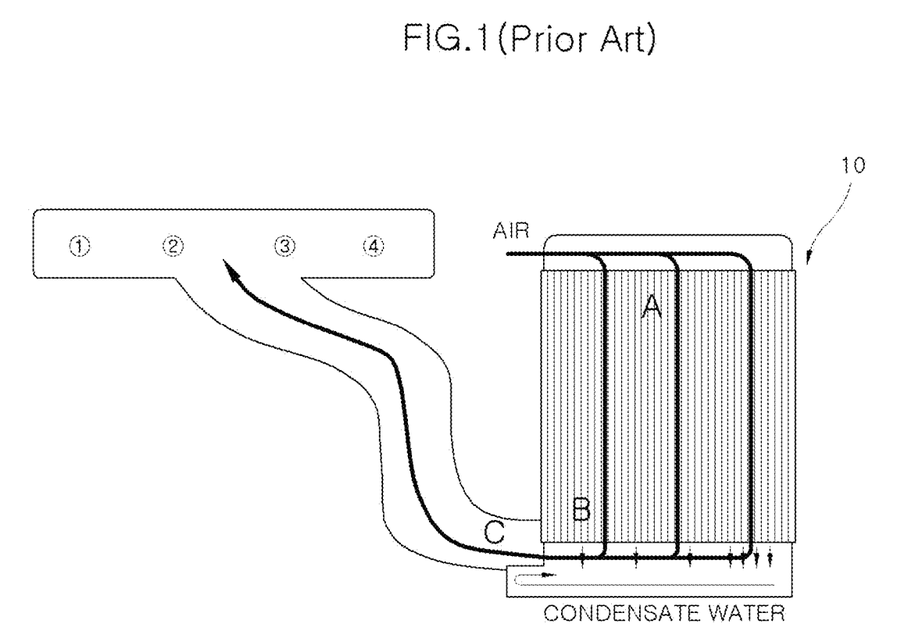
FIG. 1 is a diagram illustrating an intercooler applied to a supercharge system and generation of condensate water.

In order to cool the compressed high-temperature air, the compressed high-temperature air is cooled through an intercooler 10 shown in FIG. 1 and then introduced into the engine.

Figure 2:
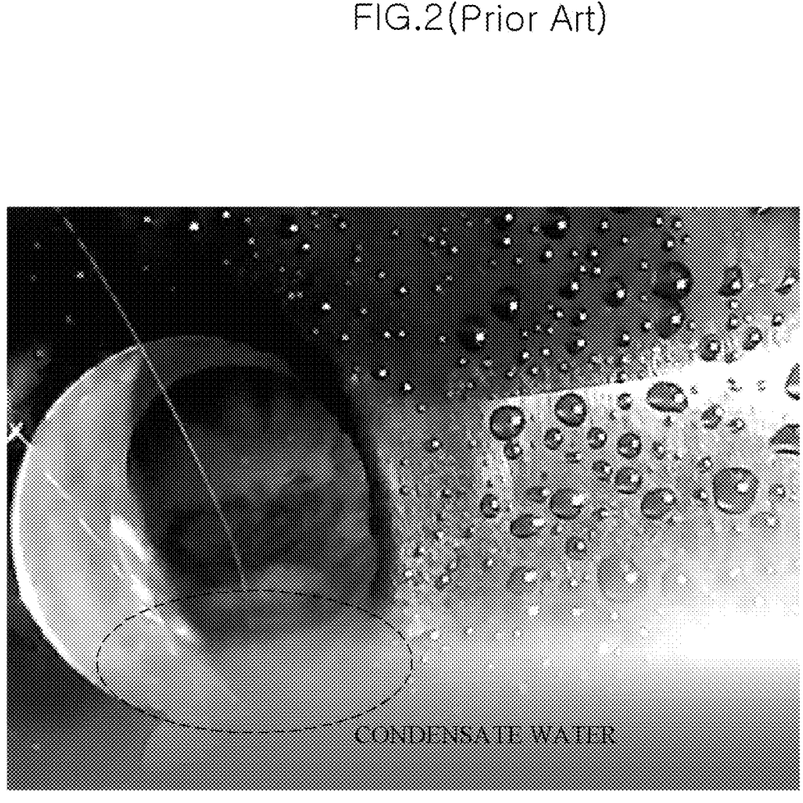
FIG. 2 is a photograph showing an endoscope observation result of "C" portion in FIG. 1.

Since the air is cooled by the intercooler 10 and supplied to the engine, the charging efficiency in the cylinder may be increased. However, according to an operation of the engine, the air inevitably reaches a saturated water vapor pressure and thus condensate water is generated. FIG. 2 is a photograph of an endoscope observation of an intercooler outlet C shown in FIG. 1, and it can be confirmed that condensate water is accumulated.

However, in a vehicle equipped with a hybrid engine, during a wide open throttle (WOT) acceleration after constant speed driving, excessive condensate water is introduced into the engine so that there is a possibility of misfire, and it can be seen that a misfire occurred even in experimental verification.

As for the degree of contributing to the misfire, it can be confirmed that an intercooler main body "A" largely contributes to the misfire among the intercooler main body "A", a lower reservoir: B", and the intercooler outlet "C".

Conventionally, in order to compensate for the above problem, there is a method of optimizing an EGR limit correction coefficient map for each intake air temperature/engine temperature to solve the above problem through correction for reducing an EGR rate in terms of data.

In addition, there is a method of partially blocking an outlet by adding a diaphragm to the outlet of an intercooler by hardware. In the case of a simplified diaphragm type, an effect of removing condensate water is insignificant. However, some specific shapes have an effect of delaying generation of condensate water within a limited range.

Alternatively, in order to discharge generated condensate water to the outside, addition of a separate configuration has been proposed.

The contents described in the above Description of Related Art are to aid understanding of the background of the present disclosure and may include what is not previously known to a person of ordinary skill in the art to which the present disclosure pertains.

SUMMARY

The present disclosure provides a method of controlling a split inflow of condensate water, which is capable of inhibiting or preventing an engine misfire due to an inflow of condensate water in a vehicle equipped with a hybrid engine.

Other objects and advantages of the present disclosure can be understood by the following description and become apparent with reference to exemplary forms of the present disclosure. Also, it is obvious to those skilled in the art to which the present disclosure pertains that the objects and advantages of the present disclosure can be realized by the means as claimed and combinations thereof.

In one form of the present disclosure, a method of controlling a split inflow of condensate water in a hybrid engine includes: deriving an amount of condensate water generated by an exhaust gas recirculation (EGR) device of a hybrid electric vehicle (HEV); deriving an amount of the condensate water introduced into an hybrid engine; calculating an accumulated amount of the condensate water by subtracting the inflow amount of the condensate water from the derived amount of the condensate water generated by the EGR device; comparing the accumulated amount of the condensate water with a predetermined reference amount of the condensate water; and when the accumulated amount of the condensate water exceeds the predetermined reference amount of the condensate water, controlling an engine torque of the HEV to be increased.

Here, the deriving of the amount of the condensate water generated by the EGR device may include calculating a generation amount of the condensate water through a cumulative physical model of condensate water, which is determined by physical quantities; and calculating an experimental value of the condensate water through a cumulative experimental model of condensate water, which is experimentally determined based on an operating point.

In addition, in the deriving of the amount of the condensate water generated by the EGR device, a large value among the generation amount of the condensate water and the experimental value of the condensate water may be derived as the amount of the condensate water generated by the EGR device.

In addition, in the calculating of the generation amount of the condensate water, the generation amount of the condensate water may be calculated by reflecting an EGR gas temperature, an EGR amount, external humidity and a condensation portion temperature.

Further, in the calculating of the experimental value of the condensate water, the experimental value of the condensate water may be calculated according to a vehicle speed, a measured value of an acceleration pedal sensor (APS), a measured value of a throttle position sensor (TPS), a request torque, a state of charge (SOC) of a battery, a revolution per minute (RPM) of an engine, and a duration time.

Meanwhile, in the deriving of the amount of the condensate water introduced into the hybrid engine, an inflow amount of the condensate water with respect to each RPM and each load may be experimentally derived through a condensate water inflow experiment model.

Here, in the deriving of the amount of the condensate water introduced into the hybrid engine, the inflow amount of the condensate water may be derived by adding a corrected amount according to an outside air temperature, a cooling water temperature, and humidity detected by a hot film mass air flow (HFM) sensor.

In the controlling of the engine torque of the HEV to be increased, the engine torque may be controlled to be increased in the range of 155 NM to 165 NM.

In addition, in the controlling of the engine torque of the HEV to be increased, the motor torque of the HEV may be controlled to be decreased.

In accordance with another form of the present disclosure, a method of controlling a split inflow of condensate water in a hybrid engine includes determining whether a vehicle speed of a hybrid electric vehicle (HEV) is within a predetermined speed range when condensate water is generated; determining whether a request torque of the HEV is within a predetermined torque range; respectively determining whether a duration time of each of the vehicle speed and the request torque within the predetermined speed range and torque range is greater than or equal to a predetermined duration time; and controlling the engine torque of the HEV to be increased when the duration time is greater than or equal to the predetermined duration time.

Here, in the determining of whether the vehicle speed of the HEV is within the predetermined speed range, the predetermined speed range may range from 80 KPH to 140 KPH.

In addition, in the determining of whether the request torque of the HEV is within the predetermined torque range, the predetermined torque range may range from 70 NM to 160 NM.

In addition, in the determining of whether the duration time is greater than or equal to the predetermined duration time, the predetermined duration time may be twenty-five minutes.

Further, prior to the determining of whether the duration time is greater than or equal to the predetermined duration time, the method may further include determining whether a measured value of an acceleration pedal sensor (APS) of the HEV is greater than or equal to 40% and less than or equal to 90%.

In addition, prior to the determining of whether the duration time is greater than or equal to the predetermined duration time, the method may further include determining whether a measured value of a throttle position sensor (TPS) of the HEV is greater than or equal to 40% and less than or equal to 80%.

In addition, prior to the determining of whether the duration time is greater than or equal to the predetermined duration time, the method may further include determining whether a state of charge (SOC) of a battery of the HEV is greater than or equal to 30%.

Thus, in the controlling of the engine torque of the HEV to be increased, the engine torque may be controlled to be increased in the range of 155 NM to 165 NM.

In addition, in the controlling of the engine torque of the HEV to be increased, the motor torque of the HEV may be controlled to be decreased.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Reference should be made to the accompanying drawings that illustrate exemplary forms of the present disclosure, and to the description in the accompanying drawings in order to fully understand the present disclosure and operational advantages of the present disclosure, and objects attained by practicing the present disclosure.

In describing exemplary forms of the present disclosure, known technologies or duplicate descriptions may be reduced or omitted to avoid obscuring appreciation of the disclosure by a person of ordinary skill in the art.

Figure 3A:
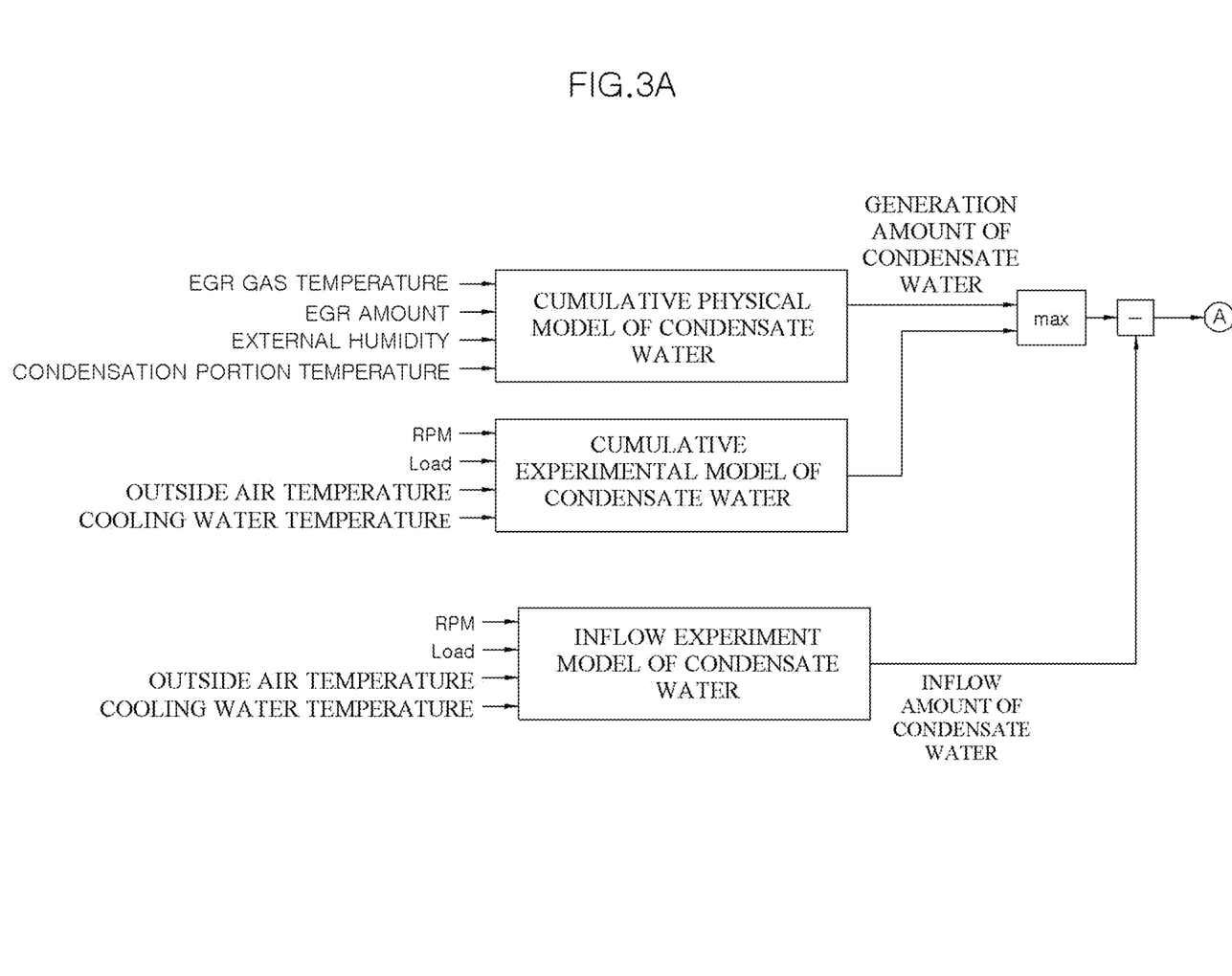
FIG. 3A and FIG. 3B are diagrams respectively illustrating a logic configuration of a method of controlling a split inflow of condensate water in one form of the present disclosure.
Figure 3B:
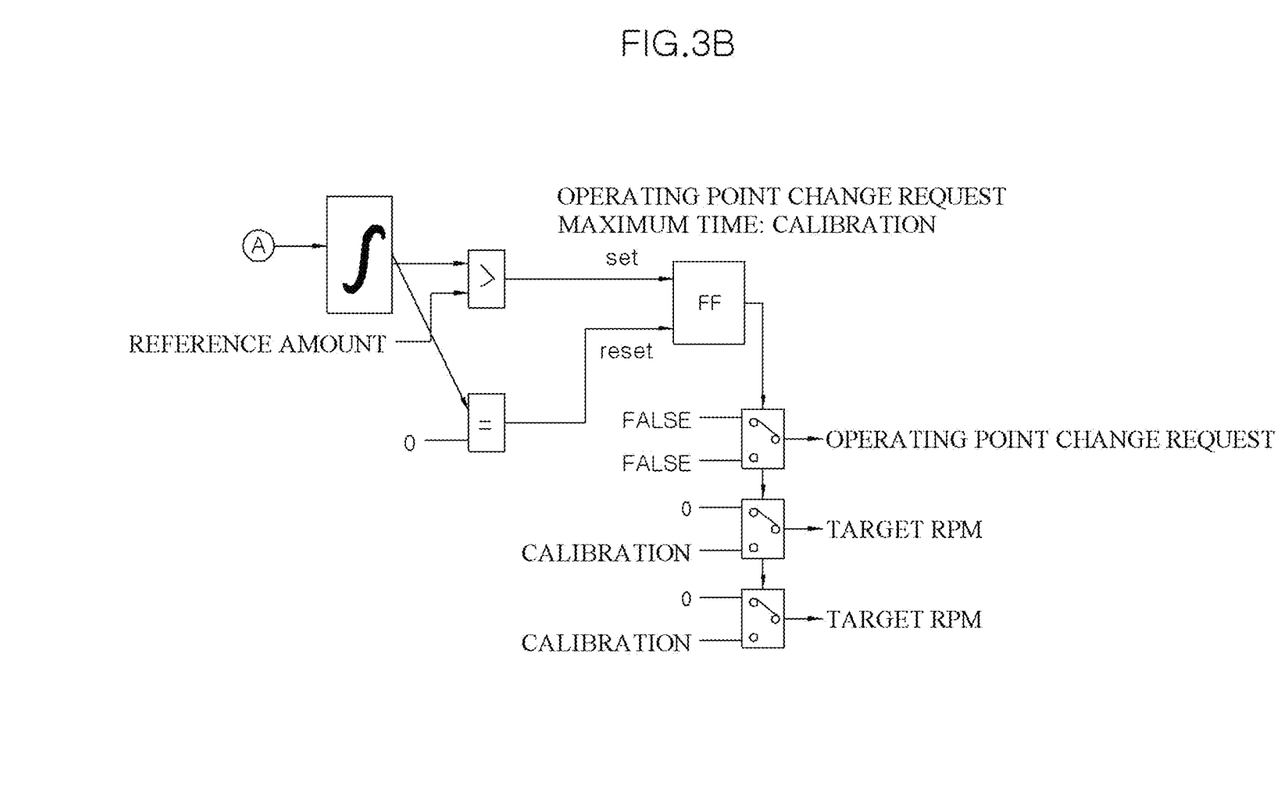
Figure 4:
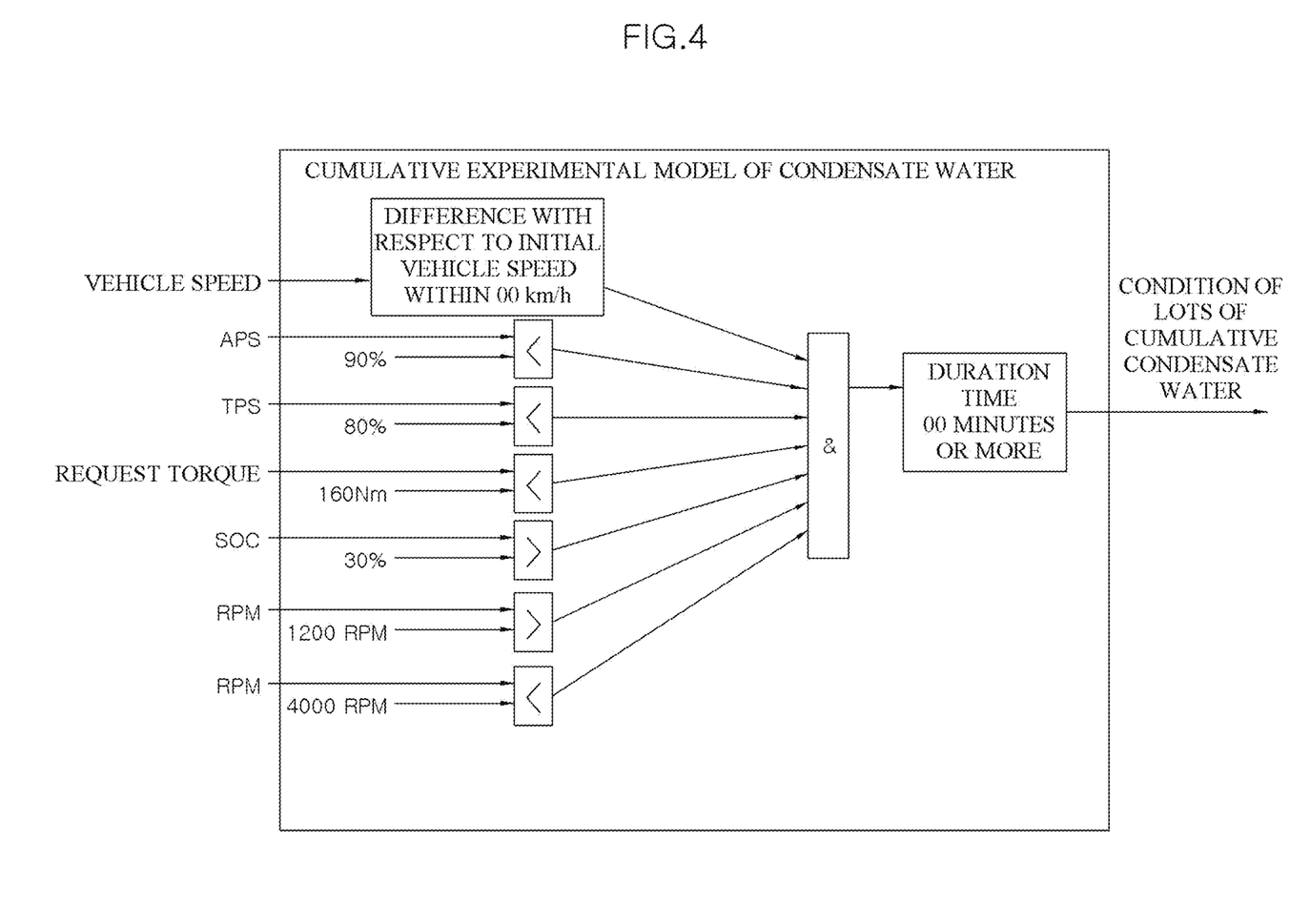
FIG. 4 is a diagram illustrating a cumulative experimental model of condensate water of FIG. 3A.
Figure 5:
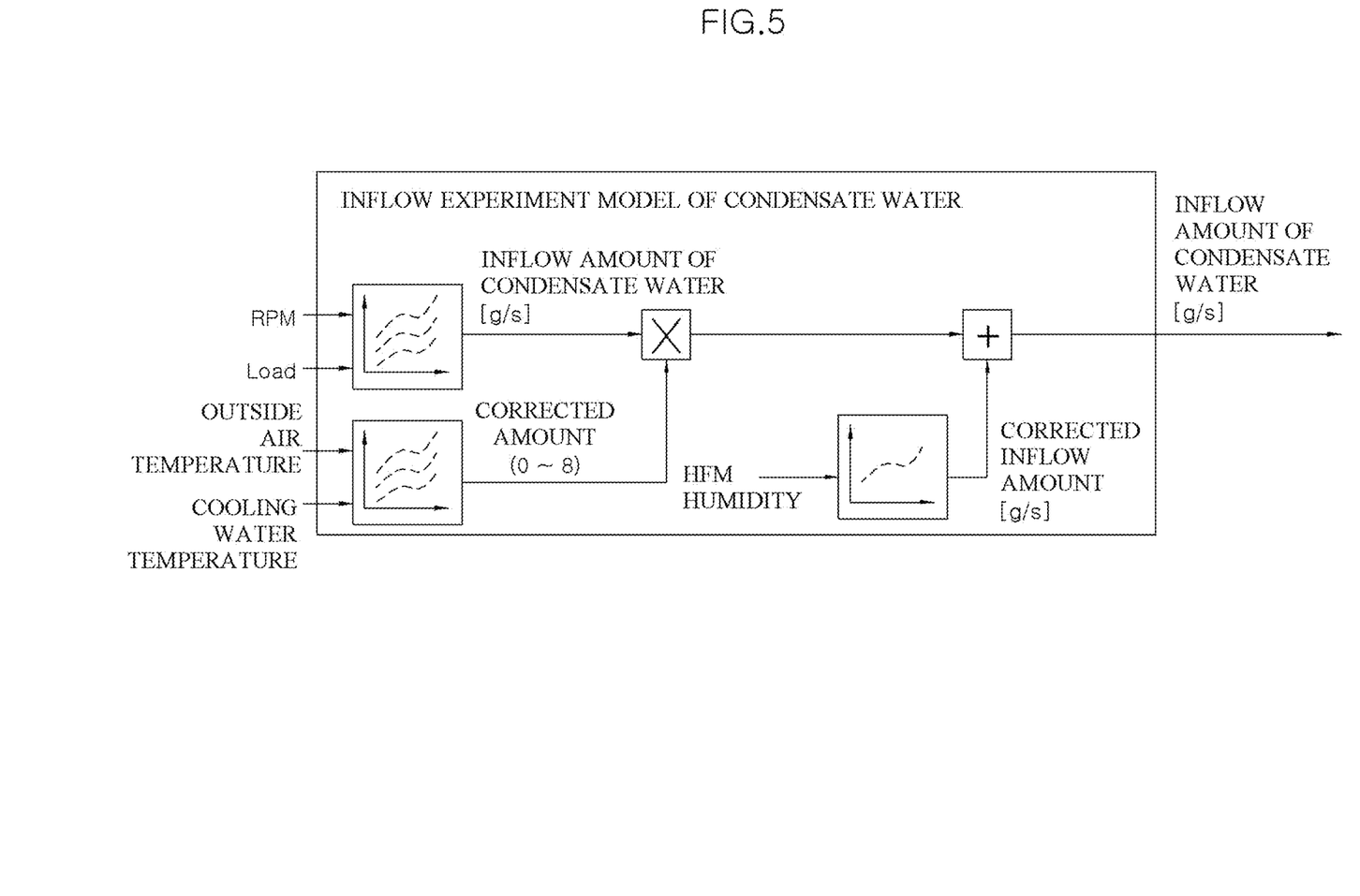
FIG. 5 is a diagram illustrating a condensate water inflow experiment model of FIG. 3A.
Figure 6:
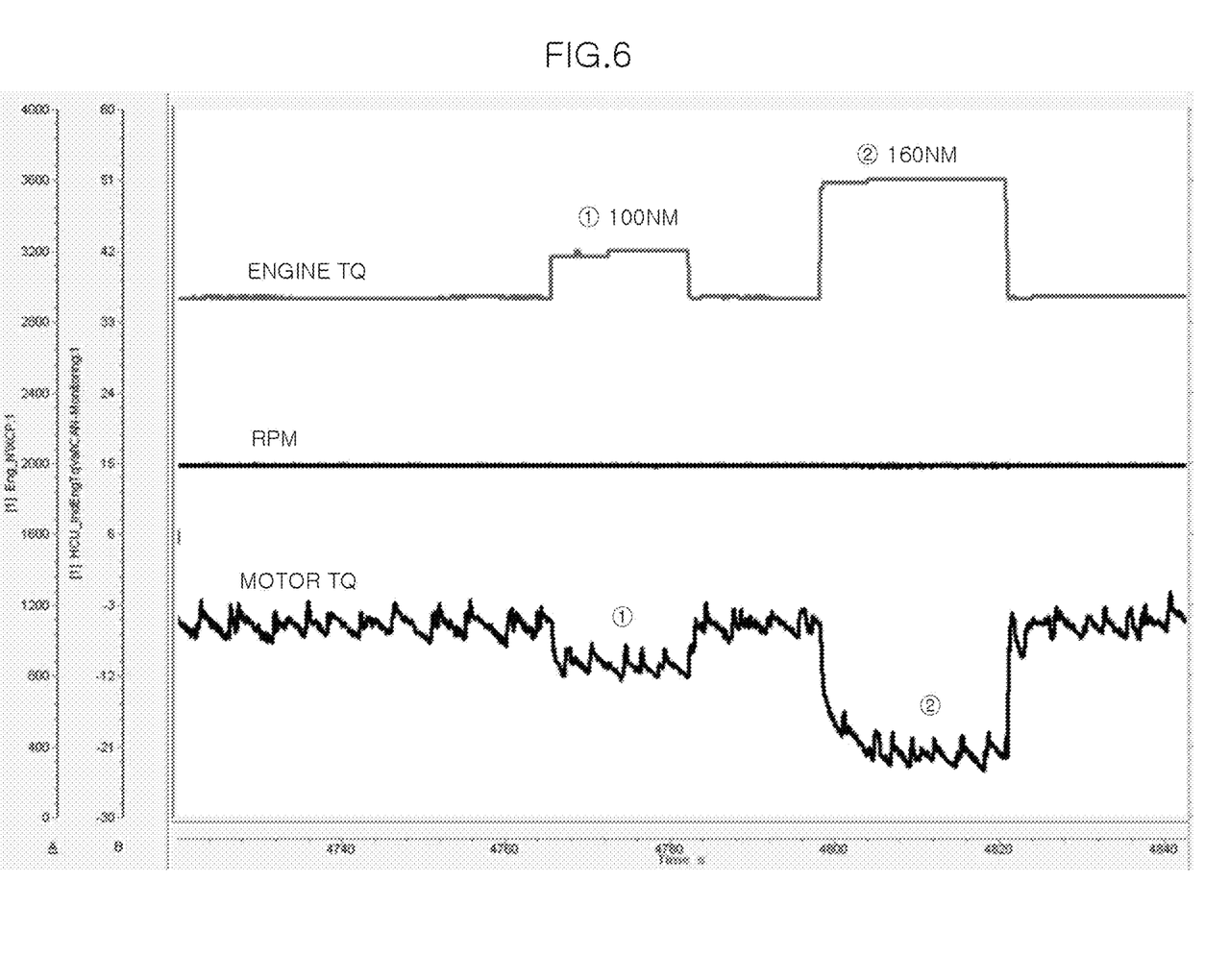
FIG. 6 is a graph showing a torque control relationship in the method of controlling a split inflow of condensate water according to one form of the present disclosure.

FIG. 3A and FIG. 3B are diagram respectively illustrating a logic configuration of a method of controlling a split inflow of condensate water according to one form of the present disclosure, FIG. 5 is a diagram illustrating a cumulative condensate water experiment model of FIG. 4, and FIG. 6 is a diagram illustrating a condensate water inflow experiment model of FIG. 4.

Figure 7:
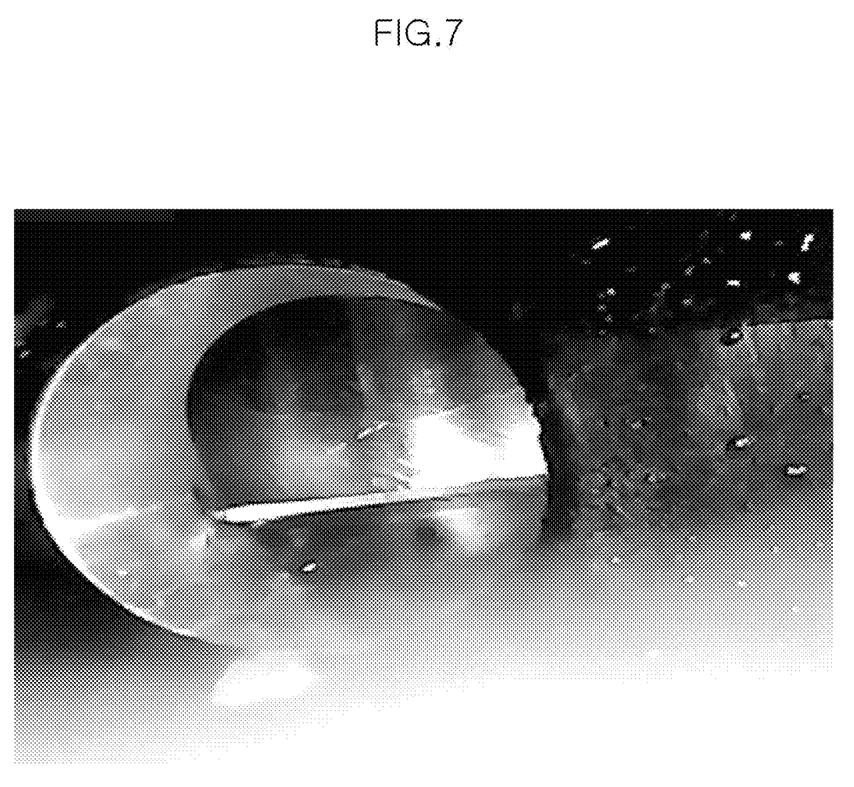
FIGS. 7 and 8 are photographs respectively showing intercooler outlets in states of FIG. 6.
Figure 8:
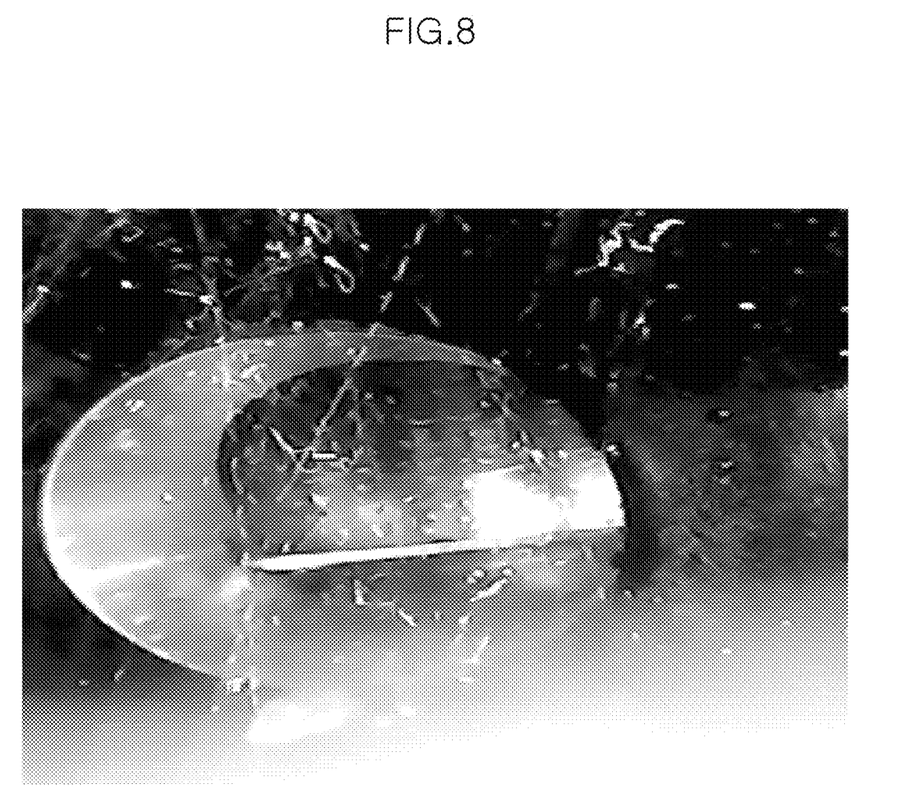
Figure 9:
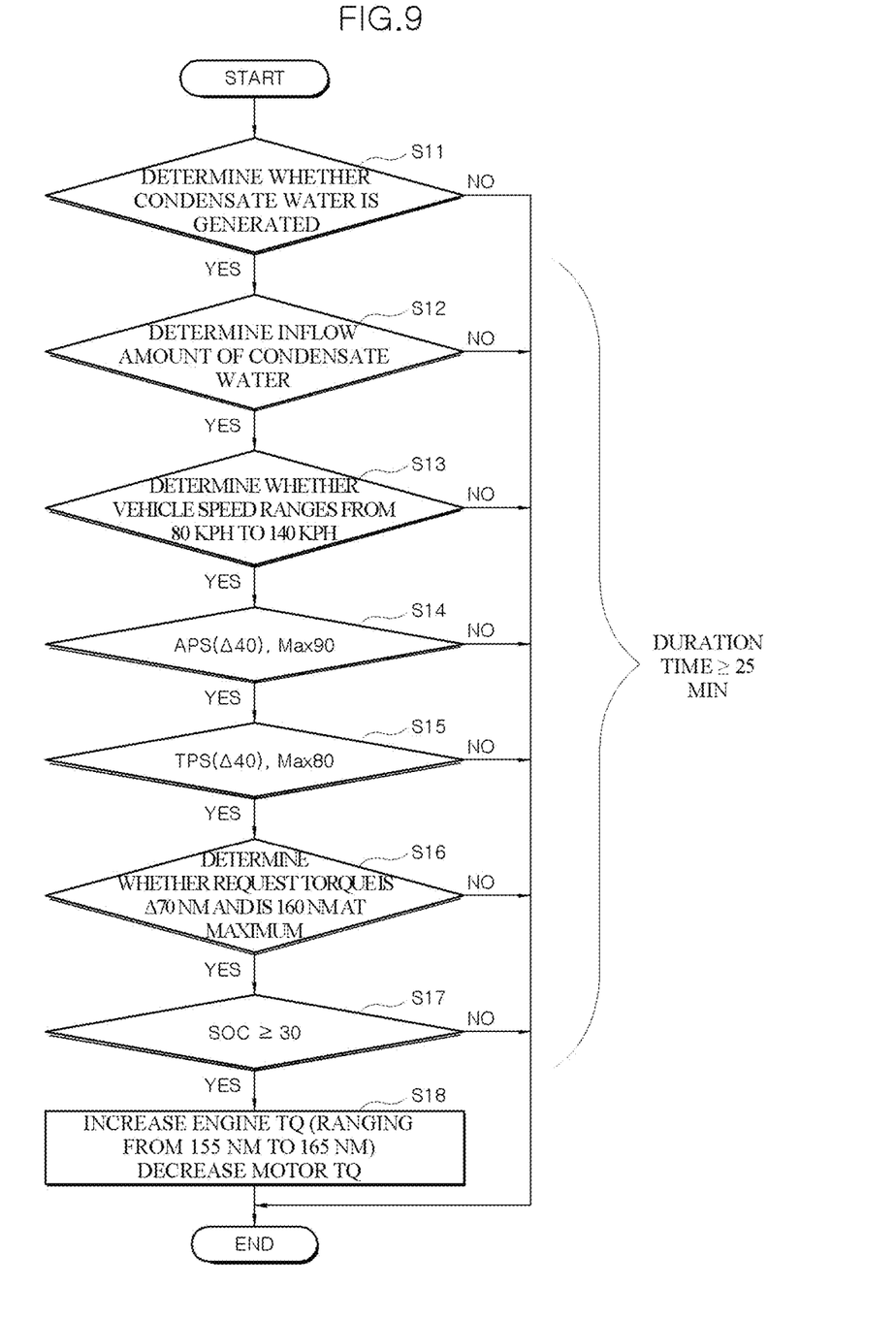
FIG. 9 is a flowchart illustrating the method of controlling a split inflow of condensate water according to another form of the present disclosure.

FIG. 6 is a graph showing a torque control relationship in the method of controlling a split inflow of condensate water according to another form of the present disclosure, FIGS. 7 and 8 are photographs showing intercooler outlets in states of FIG. 6, and FIG. 9 is a flowchart illustrating the method of controlling a split inflow of condensate water in one form of the present disclosure.

Hereinafter, a method of controlling a split inflow of condensate water in a hybrid engine according to one form of the present disclosure will be described with reference to FIGS. 3 to 9.

The present disclosure relates to a control method capable of reducing the risk of an engine misfire due to an excessive inflow of condensate water by artificially splitting condensate water, which is generated by an exhaust gas recirculation (EGR) device of a hybrid electric vehicle (HEV) equipped with a hybrid engine, and introducing the split condensate water into the hybrid engine.

In the HEV, as a result of driving at a constant speed for a certain time period or longer, condensate water is accumulated due to an operation of the EGR device. Therefore, when the accumulated condensate water is introduced into the hybrid engine at once, the accumulated condensate water may act as a risk factor, and thus the control method is to solve the risk factor.

That is, when a low pressure (LP)-EGR is used in a supercharged engine, condensate water is accumulated in an intake intercooler and, in a high load condition, since the condensate water of the intake intercooler is introduced into the hybrid engine, the accumulation of the condensate water does not occur.

As shown in FIG. 3A and FIG. 3B, an EGR condensation amount and an inflow amount of EGR condensate water are calculated and an operating point is changed according to the calculated results so that a target revolution per minute (RPM) and a target torque are changed to control the condensate water to be split and introduced into the hybrid engine.

A relationship of a split inflow of the condensate water according to the change of the target torque will be described below.

First, the calculation of the EGR condensation amount is determined by a cumulative physical model of the condensate water and a cumulative experimental model of the condensate water.

The cumulative physical model of the condensate water is to calculate a generation amount of condensate water according to physical quantities such as an EGR gas temperature, an EGR amount, external humidity, and a condensation portion temperature (i.e., a temperature at a rear end of the intercooler).

The cumulative experimental model of the condensate water is to experimentally calculate an amount of condensation based on operating points (RPM and load), an outside air temperature, and a cooling water temperature. As shown in FIG. 5, the cumulative experimental model of the condensate water experimentally models an accumulated amount of condensate water according to a vehicle speed, an accelerator pedal position detected by an acceleration pedal sensor (APS), a throttle opening amount detected by a throttle position sensor (TPS), a request torque, a state of charge (SOC) of a battery, an RPM of an engine, and a duration time. In other words, the accumulated amount of condensate water is determined according to a cumulative time of the EGR use at a specific RPM and a specific load.

A maximum value among the generation amount of condensate water calculated by the cumulative physical model of the condensate water and the accumulated amount of condensate water calculated by the cumulative experimental model of the condensate water is set as the accumulated amount of the condensate water.

In addition, through the cumulative experimental model of the condensate water, an inflow amount of the condensate water is experimentally derived with respect to each RPM and each load, and also, in consideration of an outside air temperature, a cooling water temperature, and a corrected amount of humidity detected by a hot film mass air flow (HFM) sensor, an inflow amount of the condensate water is derived.

Next, an accumulated amount of the condensate water is derived by subtracting the inflow amount of the condensate water from the calculated accumulated amount of the condensate water.

Then, the derived accumulated amount of the condensate water is compared with a preset reference amount of the condensate water, and, when the derived accumulated amount of the condensate water exceeds the preset reference amount of the condensate water, control is performed to request a change of the operating point for a split inflow of the condensate water.

Therefore, it is possible to express an accumulation amount model of the condensate water=$f(\Delta T(+), \Delta m(-), t(+)$, and the like), wherein T is a torque, m is the inflow amount of the condensate water, and t is a cumulative driving time.

In addition, it is possible to variably control EGR target flow rate correction criteria (an intake air temperature and an outside air temperature) or control to limit an EGR rate according to the accumulated amount of the condensate water calculated by the above logic.

In order to change the operating point, an electronic control unit (ECU) transmits an operating point change request TRUE, a target RPM, and target torque information to a hybrid control unit (HCU) to request an operating point change for changing a torque value.

The method of controlling a split inflow of condensate water according to the present disclosure is to control an engine torque and a motor torque through the above logic and artificially split the accumulated condensate water and introduce the split condensate water into the engine, thereby removing the condensate water.

That is, the engine torque is controlled to be increased to allow the condensate water to be split and introduced and controlled to be increased in the range of 155 NM to 165 NM.

Owing to a characteristic of the HEV, when the HEV is driving at a constant speed, a request torque is constant, and the engine torque is increased, the motor torque is controlled to be decreased by as much as the increase of the engine torque in consideration of the SOC of the battery.

FIG. 7 is a photograph of a rear end of the intercooler when the engine torque is increased to 100 NM in FIG. 6, and FIG. 8 is a photograph of the rear end of the intercooler when the engine torque is increased to 160 NM in FIG. 6. As can be confirmed from the photographs, in the case of 100 NM that is less than 155 NM, the condensate water is not introduced. When the engine torque is increased to 160 NM within the range of the present disclosure, it can be seen that the condensate water is introduced.

Next, a method of controlling a split inflow of condensate water according to one form of the present disclosure will be sequentially described with reference to FIG. 9. The method corresponds to a control method to which the above described condensate water split inflow theory is reflected.

First, it is determined whether condensate water is generated from the EGR device of the HEV (S11).

Then, an amount of the condensate water introduced into the engine is determined (S12).

As a result, it is determined whether a vehicle speed is within a predetermined speed range when the condensate water is generated (S13). Specifically, it is determined whether the vehicle speed is greater than or equal to 80 KPH and less than or equal to 140 KPH. This is because the condensate water is maximally accumulated when the HEV is continuously driving at a predetermined vehicle speed or more.

Then, an APS value is determined when the HEV is driving at the predetermined vehicle speed (S14). It is determined whether the APS value satisfies 440% or more and 90% at maximum, that is, the APS value is less than or equal to 90%.

Then, the TPS value is determined (S15). It is determined whether the TPS value satisfies Δ40% or more and 80% at maximum, that is, the TPS value is less than or equal to 80%.

When the APS value and the TPS value are out of the above ranges, that is, in the case of a tip in/tip out, the engine torque is increased so that there is no need to perform condensate water split inflow control.

Next, it is determined whether a request torque of the HEV is within a predetermined torque range (S16). Specifically, it is determined whether a request torque value satisfies 470 NM or more and is 160 NM at maximum, that is, the request torque value is less than or equal to 160 NM.

In addition, when the request torque value is out of the above range, the condensate water split inflow control is not required.

Finally, an SOC of the battery is determined (S17). The SOC of the battery should satisfy a condition of 30% or more.

This is because, when the SOC of the battery is lower than the above condition, control of maintaining the SOC should be performed, and thus control of increasing the engine torque is not suitable.

In addition, it is determined whether a duration time satisfying the above condition is greater than or equal to a predetermined duration time, and, when the duration time is greater than or equal to the predetermined duration time, the condensate water is controlled to be split and introduced due to the increase of the engine torque and the decrease of the motor torque (S18).

Here, the predetermined duration time may be based on 25 min.

In addition, the engine torque is controlled to be increased in the range of 155 NM to 165 NM, and thus the motor torque is controlled to be decreased.

In the above description, the order of the determinations of S13 to S17 may be differently set from the example.

The operations of the method or the algorithm described in connection with the forms disclosed herein may be embodied directly in a hardware (e.g., a processor) or a software module executed by the processor, or in a combination thereof. The software module may reside on a storage medium (that is, the memory and/or the storage) such as a RAM, a flash memory, a ROM, an EPROM, an EEPROM, a register, a hard disk, a removable disk, a CD-ROM. In addition, various models discussed above may be built by performing an algorithm to predict values for inputs.

Also, the terms, such as 'unit' or 'module', etc., should be understood as a unit that processes at least one function or operation and that may be embodied in a hardware manner (e.g., a processor), a software manner, or a combination of the hardware manner and the software manner.

In accordance with a method of controlling a split inflow of condensate water in a hybrid engine according to the present disclosure, a condensate water excess condition is determined and generated and accumulated condensate water is split in advance to be introduced into the hybrid engine such that there is an advantage in that the condensate water can be evaporated from the hybrid engine without a misfire.

While the present disclosure has been described with reference to the accompanying drawings, it will be apparent to those skilled in the art that various changes and modifications may be made without departing from the spirit and scope of the present disclosure without being limited to the exemplary forms disclosed herein. Accordingly, it should be noted that such alternations or modifications fall within the present disclosure.

What is claimed is:

1. A method of controlling a split inflow of condensate water in a hybrid engine, the method comprising:
   determining whether condensate water is generated from an exhaust gas recirculation (EGR) device of a hybrid electric vehicle (HEV);
   determining an amount of the condensate water introduced into the hybrid engine;
   determining whether a vehicle speed of the HEV is within a predetermined speed range when the condensate water is generated;
   determining whether a request torque of the HEV is within a predetermined torque range;
   determining whether a duration time of the vehicle speed within the predetermined speed rang, and a duration time of the request torque within the predetermined torque range are greater than or equal to a predetermined duration time, respectively; and
   when the determined duration times are greater than or equal to the predetermined duration time, increasing an engine torque of the HEV.

2. The method of claim 1, wherein, in increasing the engine torque of the HEV, the engine torque is controlled to be increased in a range of 155 NM to 165 NM.

3. The method of claim 2, wherein, in increasing the engine torque of the HEV, a motor torque of the HEV is controlled to be decreased.

4. The method of claim 1, wherein the predetermined speed range is from 80 KPH to 140 KPH.

5. The method of claim 1, wherein the predetermined torque range is from 70 NM to 160 NM.

6. The method of claim 1, wherein the predetermined duration time is approximately twenty-five minutes.

7. The method of claim 1, further comprising:
   prior to the determining of whether the duration time is greater than or equal to the predetermined duration time, determining whether a measured value of an acceleration pedal sensor (APS) of the HEV is greater than or equal to 40% and less than or equal to 90%.

8. The method of claim 1, further comprising:
   prior to the determining of whether the duration time is greater than or equal to the predetermined duration time, determining whether a measured value of a throttle position sensor (TPS) of the HEV is greater than or equal to 40% and less than or equal to 80%.

9. The method of claim 1, further comprising:
   prior to the determining of whether the duration time is greater than or equal to the predetermined duration time, determining whether a state of charge (SOC) of a battery of the HEV is greater than or equal to 30%.

* * * * *

UNITED STATES PATENT AND TRADEMARK OFFICE
CERTIFICATE OF CORRECTION

PATENT NO. : 11,225,243 B1
APPLICATION NO. : 17/090016
DATED : January 18, 2022
INVENTOR(S) : Young-Kyu Oh and Keum-Jin Park It is certified that error appears in the above-identified patent and that said Letters Patent is hereby corrected as shown below:

In the Claims

Claim 1:
In Column 8, Line 30:
within the predetermined speed rang

Should be replaced with:
within the predetermined speed range

Signed and Sealed this
Twenty-second Day of March, 2022

Drew Hirshfeld
*Performing the Functions and Duties of the*
*Under Secretary of Commerce for Intellectual Property and*
*Director of the United States Patent and Trademark Office*